Patented May 8, 1923.

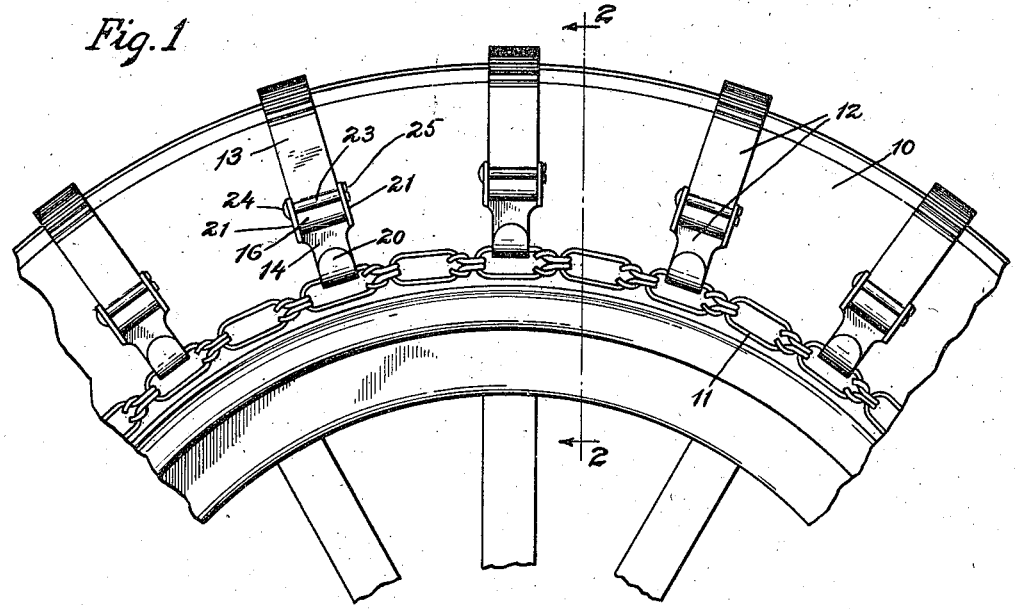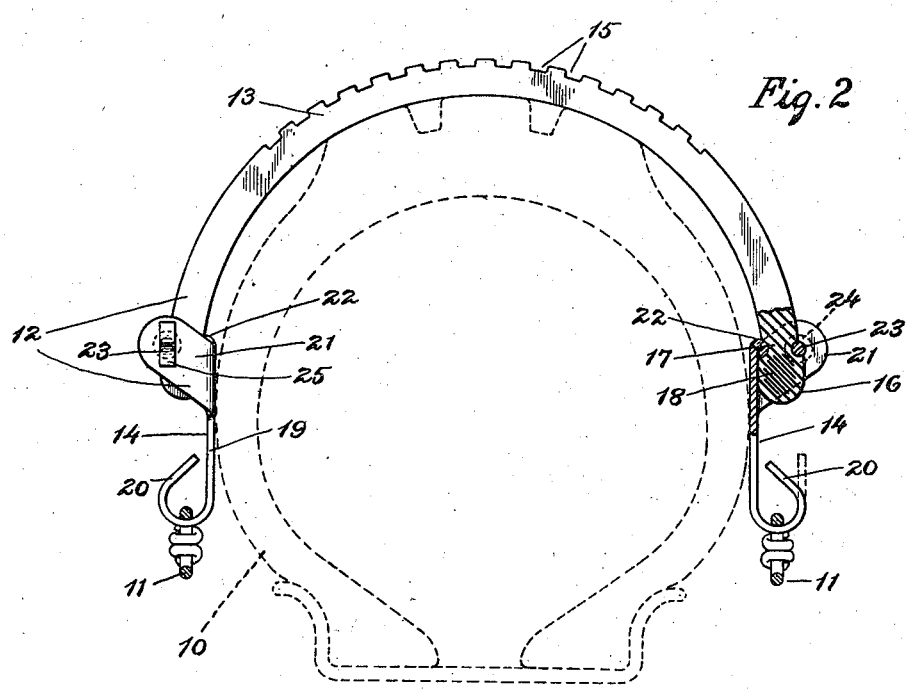

1,454,054

UNITED STATES PATENT OFFICE.

IRWIN F. KEPLER, OF AKRON, OHIO, ASSIGNOR TO THE B. F. GOODRICH COMPANY, OF NEW YORK, N. Y., A CORPORATION OF NEW YORK.

ANTISKID DEVICE FOR TIRES.

Application filed February 10, 1922. Serial No. 535,507.

*To all whom it may concern:*

Be it known that I, IRWIN F. KEPLER, a citizen of the United States, residing at Akron, in the county of Summit and State of Ohio, have invented a certain new and useful Antiskid Device for Tires, of which the following is a specification.

This invention relates to cross-straps of rubber or rubber and fabric construction used as tractive devices for vehicle tires, and it pertains especially to the construction of the metal end-fasteners which connect the rubber strap-body with the side chains or other means for retaining said cross-straps upon the wheel. My object is to provide an end-fastener of durable construction adapted to be securely connected with the cross-strap without tending to cause breakage of the latter in use, and also preferably adapted to be detached therefrom if either the strap or the fastener should become broken, thus permitting ready renewal and substitution of either or both of these parts.

Of the accompanying drawings, Fig. 1 is a side elevation showing a portion of a wheel and tire on which is mounted a tire "chain" having cross members constructed according to my invention.

Fig. 2 is a cross section on the line 2—2 of Fig. 1, with the tire and rim in broken lines.

In the drawings, 10 is a pneumatic tire, 11, 11 are the side-chains or rings of a non-skid device thereon, and 12, 12 are the cross-members having their ends inter-hooked with the links of the chain 11 at intervals. Each cross-member includes a strap 13 having a body preferably of a highly stretchable, soft-rubber construction, and metallic end-fasteners 14. The strap is preferably molded in arcuate form to conform to the shape of the tire and its tread portion is provided with corrugations 15, although this feature is not essential. The ends of the strap are formed with beads 16 which connect with the body of the strap by reduced neck portions 17, and each bead is reinforced with a relatively-hard core 18 which I prefer to make of hard or semi-hard rubber, as set forth in co-pending application of Walter W. Evans, Serial No. 535,511, filed concurrently herewith. Each neck 17 is formed between a pair of grooves molded in the rubber.

The end-fasteners 14 are formed out of flat or sheet metal and each comprises a body-plate 19 having a hook 20 at its inner end and a pair of outwardly directed parallel ears 21. At the outer edge of the body-plate, the metal is turned outwardly to form a bead 22 adapted to occupy the groove adjacent the neck 17 on the inner side of the strap 13. The groove on the outer side is occupied by a cylindrical bar or pin 23 inserted endwise through apertures in the respective ears 21, each pin having a head 24 at one end while its opposite end 25 is split or bifurcated and adapted to be spread or riveted over after the manner of a cotter pin to retain the pin in place. The bifurcated end can be bent straight or sheared off when it is desired to remove the pin and disconnect the fastener. The broken-line position of the end of the hook 20 at the right in Fig. 2 indicates the open shape of the hook before being bent over around the chain link. It is also possible to use these cross-members singly without side chains, and suitably connect their ends together around the felly or otherwise secure them upon the wheel.

It is found that the above-described construction is durable and effective, being superior to many forms of construction which have failed to stand up and give the desired results in service.

I claim:

1. An end-fastener for tractive tire straps comprising a plate formed at one end with a hook and at the other end with a pair of ears, said plate having parallel strap-gripping members, one of which is a pin supported at its ends by said ears.

2. An end-fastener for tractive tire straps comprising a metal plate formed with a hook at one end and with a pair of ears at the opposite end, the edge of said plate being turned over to form a bead between the ears constituting one of a pair of strap-gripping members, the other strap-gripping member being a pin mounted in apertures in said ears and having a head at one end, the other end being bifurcated and spread to retain the pin in place.

In witness whereof I have hereunto set my hand this 7th day of February, 1922.

IRWIN F. KEPLER.